No. 871,578. PATENTED NOV. 19, 1907.
A. H. EHLE.
CONTROLLING MECHANISM FOR CLUTCHES.
APPLICATION FILED SEPT. 12, 1905.

3 SHEETS—SHEET 2.

Witnesses:

Inventor:
Archibald H. Ehle.
by his Attorneys:
Howson & Howson

No. 871,578.  
A. H. EHLE.  
CONTROLLING MECHANISM FOR CLUTCHES.  
APPLICATION FILED SEPT. 12, 1905.

PATENTED NOV. 19, 1907.

3 SHEETS—SHEET 3.

Witnesses:

Inventor  
Archibald H. Ehle  
by his Attorneys  
Howson & Howson

UNITED STATES PATENT OFFICE.

ARCHIBALD HYDE EHLE, OF PHILADELPHIA, PENNSYLVANIA, ASSIGNOR TO BURNHAM, WILLIAMS & COMPANY, OF PHILADELPHIA, PENNSYLVANIA.

CONTROLLING MECHANISM FOR CLUTCHES.

No. 871,578.　　　　　Specification of Letters Patent.　　　Patented Nov. 19, 1907.

Application filed September 12, 1905. Serial No. 278,127.

*To all whom it may concern:*

Be it known that I, ARCHIBALD HYDE EHLE, a citizen of the United States, residing in Philadelphia, Pennsylvania, have invented certain Improvements in Controlling Mechanism for Clutches, of which the following is a specification.

The object of my invention is to provide a simple and effective means for controlling clutches for throwing into and out of gear the mechanism between a driving and a driven shaft.

My invention is particularly adapted for use in connection with the motors of a car in which the driving mechanism is carried by the trucks and a controller is mounted on the car body.

Figure 1:
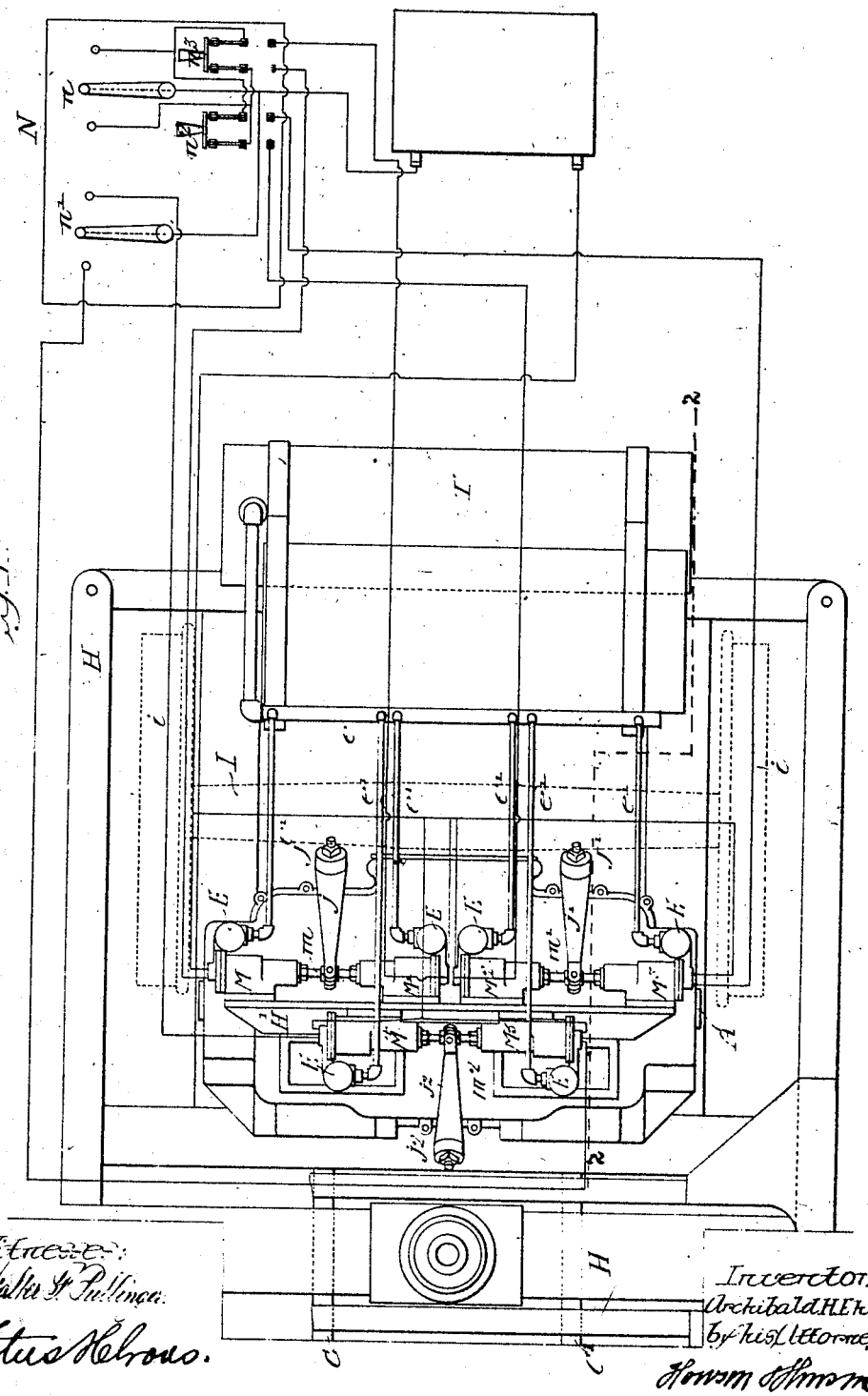
Figure 2:
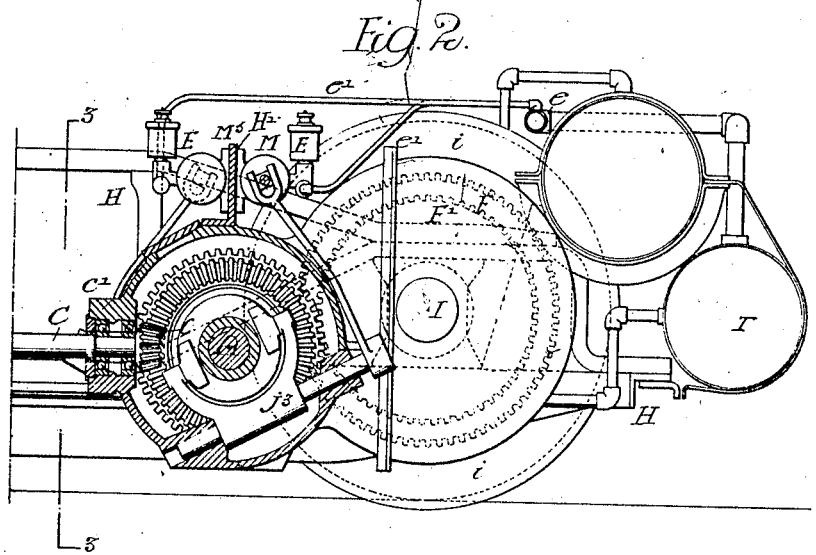
Figure 5:
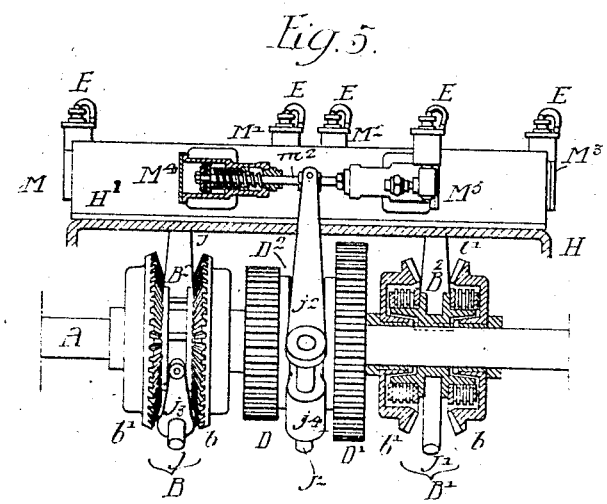
Figure 4:
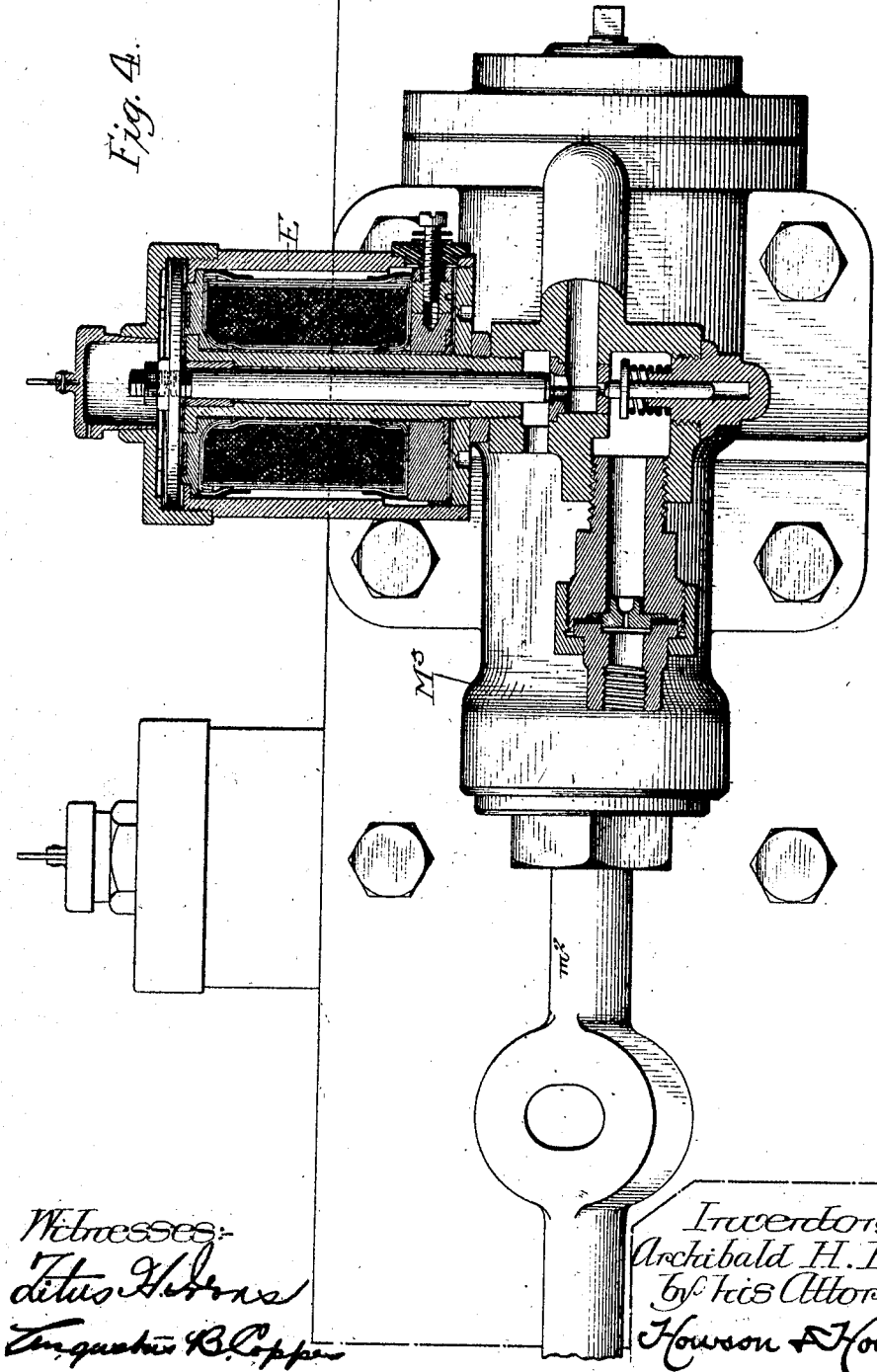

Figure 1, is a plan view of a portion of a car truck illustrating in diagram my improved controlling mechanism; Fig. 2, is a section on the line 2—2, Fig. 1, with the gear case removed; Fig. 3, is a section on the line 3—3, Fig. 2, illustrating one of the clutches in section, and Fig. 4, is a vertical section of one of the magnetic valves used in connection with my invention.

Referring to the drawings, H is the frame of a car truck in the present instance of the pivoted or swing type, having boxes for the axle I on which the flanged wheels $i$ $i$ are mounted.

C, C', are two driving shafts which in the present instance are the crank shaft of two gasolene engines, these shafts are mounted in suitable boxes $c'$ and each shaft has a pinion $c$ at one end.

A is an intermediate shaft mounted in suitable bearings on the frame H and on this shaft A are two sets of bevel wheels B, B', each set includes two bevel wheels $b$ $b'$, loose on the shaft, and an intermediate clutch sleeve $B^2$ keyed to the shaft so that it can slide on, but must turn with the shaft. In the present instance, the clutches are shown as plate friction clutches (Fig. 3), two sets of disks being mounted between each wheel and the clutch sleeve, but it will be understood that any form of clutch may be used without departing from my invention.

When a clutch sleeve $B^2$ is moved in one direction, one bevel gear is clutched to the shaft A, and when the sleeve is thrown in the opposite direction, the other bevel gear is clutched to the shaft and the motion of the shaft will be reversed and when in the mid position the sleeve is free of either gear wheel. In the present instance, situated between the two sets of bevel gear wheels, are two gears D D' of different diameters, and between these two gears is a friction sleeve $D^2$, and between this sleeve and each of the gear wheels D D' is a clutch mechanism similar to the mechanism between the sleeve $B^2$ and one of the gears $b$. The two gear wheels are loose upon the shaft and the sleeve is splined to the shaft, so that it can slide on but must turn with the shaft.

The two gear wheels D D' mesh respectively with gear wheels F F', of different diameters, on the driven shaft or axle I. Thus it will be seen that the power is transmitted from the driving shafts C C' through the gearing on the intermediate shaft A to the axle or driven shaft I, and the clutch mechanism is so arranged that either one or both of the driving shafts can be geared to the driven shaft, or the direction of movement of the driven shaft can be reversed.

J J' are rock shafts having forks $j^3$ engaging the sleeves $B^2$ $B^2$, and the shaft J has an arm $j$ engaging a plunger rod $m$. The plungers of this rod are adapted to air cylinders M M'. The shaft J' has an arm $j'$ engaging a rod $m'$ having plungers adapted to air cylinders $M^2$ $M^3$. When air is admitted into the cylinders M and $M^2$ the clutch sleeves are moved in one direction, and when air is admitted into the cylinders M' and $M^3$ the clutch sleeves are moved in the opposite direction.

The central rock shaft $J^2$ has a fork $j^4$ engaging the sleeve $D^2$ and an arm $j^2$ engaging a plunger rod $m^2$ having plungers working in the cylinders $M^4$ and $M^5$.

Each cylinder is provided with a magnetic valve E of the solenoid type constructed as illustrated in Fig. 4; these valves control the flow of air to and from the several cylinders. In the present instance the air cylinders M M' $M^2$ $M^3$ are mounted on one side of a plate H' rigidly secured to the frame of the truck, and the air cylinders $M^4$ and $M^5$ are mounted on the opposite side of said plate, making a very rigid and substantial construction.

The passage from each valve connects with the rear of its cylinder and the inlet port is connected to a pipe $e'$; the pipes $e'$ extending from each valve are coupled to a manifold pipe e in the present instance which in turn is connected to an air tank T in which compressed air is stored.

N is a controller, in the present instance illustrated as a plate having switches n n' and cut-outs n² and n³. The switch n controls the engine clutches, the switch n' controls the fast and slow speed gear, and the cut-outs are for the purpose of cutting out either of the two power shafts.

Wires lead from the several magnetic valves to the switch board n, as clearly shown in Fig. 1 of the drawings. These wires can be carried through a cable or may be run in any suitable manner, when the mechanism, to be controlled moves independently of the part upon which the controller is mounted. If for instance, as shown in the drawing, the parts are mounted on the truck of a car the controller would be mounted on the car body and wires would lead from the car body to the truck in a manner that would provide for the free pivoting of the truck. Such a type of truck is illustrated in the application for patent filed by me on the twenty-second of July, 1905, Serial Number 270,857.

When the two cut-out switches n² n³ are in the position the reverse to that shown in Fig. 1 both clutch sleeves B² B² can be controlled by the one switch n; when the switch n is in the mid position both the rock shafts J J' are central, and consequently both clutch sleeves are out of gear. When the switch is thrown to the right contact is made so that air will be admitted to the cylinders M' M³, and the driving shaft will move the shaft A in one direction or forward. When the switch n is moved to the left air is admitted to the cylinders M M² and the movement of the shaft A is reversed. When the switch n' is moved to the right then the lever J² is shifted so that the high speed is thrown into gear, and when moved to the left the low speed is thrown into gear. Thus the entire driving mechanism is under the control of the operator.

I claim as my invention:—

1. The combination of a shaft, a clutch sleeve thereon, means for shifting the said sleeve, air cylinders controlling the shifting mechanism, magnetic valve mechanism for controlling the admission of air to the said cylinders, and a controller having a switch lever thereon controlling the magnetic valves, substantially as described.

2. The combination of a shaft, two clutch sleeves thereon, means for shifting said clutch sleeves, air cylinders controlling the movement of said means, magnetic valves for controlling the admission of air to the said cylinders, and a switch for controlling the magnetic valves, with cut-outs, for throwing either one or both of the clutch sleeves, under the control of the switch, substantially as described.

3. The combination of a shaft, two clutch sleeves mounted on the shaft, rock shafts for moving said clutch sleeves, arms on the said rock shafts, air cylinders, plungers in said cylinders, rods connecting the plungers of each pair of cylinders and connected to an arm of the rock shaft, magnetic valves controlling the admission of air to the said cylinders, a switch lever for controlling the magnetic valves, and cut-outs, for throwing either one or both of the clutch sleeves, under the control of the switch, substantially as described.

4. The combination of a shaft, clutch sleeves mounted on said shaft, rock shafts for the clutch sleeves, arms on each rock shaft, a pair of air cylinders, each pair having a plunger rod and each rod being connected to an arm of a rock shaft controlling a clutch sleeve, a magnetic air valve for each cylinder, a controller, two cut-outs, and wires leading from the controller to the magnetic valves, the cut-outs being so arranged that either one or both of the clutch sleeves between the driving shafts and the intermediate clutch shaft can be operated, substantially as described.

In testimony whereof, I have signed my name to this specification, in the presence of two subscribing witnesses.

ARCHIBALD HYDE EHLE.

Witnesses:
M. E. NEVILLE,
WM. E. SHUPE.